United States Patent
Olivier et al.

(10) Patent No.: US 10,148,958 B2
(45) Date of Patent: Dec. 4, 2018

(54) METHOD AND DEVICE FOR ENCODING AND DECODING A HDR PICTURE AND A LDR PICTURE

(71) Applicant: THOMSON LICENSING, Issy les Moulineaux (FR)

(72) Inventors: Yannick Olivier, Thorigne Fouillard (FR); David Touze, Rennes (FR); Catherine Serre, Saint Gregoire (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 258 days.

(21) Appl. No.: 14/953,017

(22) Filed: Nov. 27, 2015

(65) Prior Publication Data
US 2016/0156908 A1 Jun. 2, 2016

(30) Foreign Application Priority Data

Nov. 27, 2014 (EP) .................... 14306904

(51) Int. Cl.
*H04N 19/122* (2014.01)
*H04N 19/30* (2014.01)
(Continued)

(52) U.S. Cl.
CPC ......... *H04N 19/122* (2014.11); *H04N 19/184* (2014.11); *H04N 19/30* (2014.11); *H04N 19/50* (2014.11); *H04N 19/98* (2014.11)

(58) Field of Classification Search
CPC .... H04N 19/122; H04N 19/184; H04N 19/30; H04N 19/50; H04N 19/98
(Continued)

(56) References Cited

U.S. PATENT DOCUMENTS 8,406,569 B2  3/2013  Segall et al.
2009/0046207 A1  2/2009  Salvucci
(Continued)

FOREIGN PATENT DOCUMENTS

EP          1933566       6/2008
WO       WO2012147022    11/2012
(Continued)

OTHER PUBLICATIONS

Philippe Bordes: "Weighted Prediction", JCTVC-E041, Mar. 2011.*
(Continued)

*Primary Examiner* — Jamie J Atala
*Assistant Examiner* — Ayman A Abaza
(74) *Attorney, Agent, or Firm* — Meagher Emanuel Laks Goldberg & Liao, LLP

(57) ABSTRACT

At least one of the present embodiments generally relates to a method for encoding a HDR picture and a first LDR picture, the method comprising obtaining a second LDR picture responsive to a ratio between the HDR picture and a backlight picture and encoding the first LDR picture and the second LDR picture by predicting one of the first and second LDR pictures by the other one of the first and second LDR pictures. The method wherein it further comprises, before encoding, adjusting the first LDR picture responsive to the backlight picture. The disclosure relates also to a method and device for decoding an LDR picture providing a lower dynamic range depiction of the picture content of an HDR picture.

10 Claims, 3 Drawing Sheets

(51) Int. Cl.
  *H04N 19/184* (2014.01)
  *H04N 19/50* (2014.01)
  *H04N 19/98* (2014.01)
(58) Field of Classification Search
  USPC .................................................. 375/240.02
  See application file for complete search history.

(56) References Cited

U.S. PATENT DOCUMENTS

2013/0108183 A1      5/2013   Bruls et al.
2015/0206295 A1*    7/2015   Shah ........................ G06T 5/009
                                                                    382/166
2015/0302562 A1*   10/2015   Zhai ......................... H04N 19/46
                                                                    382/233

FOREIGN PATENT DOCUMENTS

WO      WO2013102560            7/2013
WO      WO 2013102560 A1 *    7/2013   ........... H04N 19/597

OTHER PUBLICATIONS

Leonce etal: "An Intelligent High Dynamic Range Video Codec for Handheld Devices" 2011 IEEE International Conference on Consumer Electronics; pp. 691-692.

PFStmo: "Tone Mapping Operators"; http://www.mpi-inf.mpg.de/resources/tmo/; Jul. 11, 2007; pp. 1-2.

Mantiuk etal: "Backward Compatible High Dynamic Range MPEG Video Compression" ACM 2006 proceedings of SIGGRAPH'06; pp. 1-11.

Boitard etal: "Temporal Coherency in Video Tone Mapping, a survey"; HDRi2013; pp. 1-6.

Reinhard etal: "Photographic Tone Reproduction for Digital Images"; pp. 1-10.

Bross etal: "High Efficiency Video Coding (HEVC) text specification draft 9"; TU T SG16 WP3—JCTVC-K1003_v13; Oct. 2012, pp. 1-316.

Richardson etal: "The H.264 Advanced Video Compression Standard"; Second Edition; 2010; pp. 1-348.

ITU T H 264: "Advanced video coding for generic audiovisual"; Mar. 2009; pp. 1-670.

Motra etal: "An Adaptive LogLuv Transform for High Dynamic Range Video Compression"; IEEE, Sep. 26-29, 2010; pp. 2061-2064.

Bordes: "Weighted prediction"; JCTVC-E04104 Mar. 2011 (Mar. 4, 2011); pp. 1-9.

Oh: "High Dynamic Range Image Encoding for Brightside Display"; Retrieved from the internet:URL: http://scien.stanford.edu/pages/labsite/2007/psych221/projects/07/HDR_encoding/SewoongOh_report.pdf; [retrieved on Jul. 22, 2014]; pp. 1-13OH: "High Dynamic Range Image Encoding for Brightside Display"; Retrieved from the internet:URL:http://scien.stanford.edu/pages/labsite/2007/psych221/projects/07/HDR_encoding/ SewoongOh_report.pdf; [retrieved on Jul. 22, 2014]; pp. 1-13.

Search Report dated May 21, 2015.

* cited by examiner r
METHOD AND DEVICE FOR ENCODING AND DECODING A HDR PICTURE AND A LDR PICTURE This application claims the benefit, under 35 U.S.C. § 119 of European Patent Application No. 14306904.5, filed Nov. 27, 2014.

1. FIELD

The present disclosure generally relates to picture/video encoding and decoding. In particular, the technical field of the present disclosure is related to encoding/decoding of a HDR picture whose pixels values belong to a high-dynamic range together with a LDR picture providing a lower dynamic range depiction of the picture content of the HDR picture.

The present disclosure further relates to method and device for encoding/decoding a sequence of HDR pictures, computer readable programs, processor readable medium and non-transitory storage medium.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure.

Low-Dynamic-Range pictures (LDR pictures) are pictures whose luminance values are represented with a limited number of bits (most often 8 or 10). This limited representation does not allow correct rendering of small signal variations, in particular in dark and bright luminance ranges. In high-dynamic range pictures (HDR pictures), the signal representation is extended in order to maintain a high accuracy of the signal over its entire range. In HDR pictures, pixel values are usually represented in floating-point format (either 32 bits or 16 bits for each component, namely float or half-float), the most popular format being openEXR half-float format (16 bits per RGB component, i.e. 48 bits per pixel) or in integers with a long representation, typically at least 16 bits.

A typical approach for encoding an HDR picture is to reduce the dynamic range of the picture in order to encode the picture by means of a traditional encoding scheme (initially configured to encode LDR pictures).

According to a first approach, a tone-mapping operator is applied to the input HDR picture and the tone-mapped picture is then encoded by means of a traditional 8-10 bits-depth encoding scheme such as JPEG/JPEG200 or MPEG-2, H.264/AVC for sequences of HDR pictures ("*The H.264 Advanced Video Compression Standard*", second edition, Iain E. Richardson, Wiley). Then, an inverse tone-mapping operator is applied to the decoded picture and a residual picture is calculated between the input picture and the decoded and inverse-tone-mapped picture. Finally, the residual picture is encoded by means of a second traditional 8-10 bits-depth encoder scheme.

This first approach is backward compatible in the sense that a LDR picture may be decoded and displayed by means of a traditional apparatus.

This first approach uses two encoding schemes and limits the dynamic range of the input picture to be twice the dynamic range of a traditional encoding scheme (16-20 bits). Moreover, such approach leads sometimes to a LDR picture with a weaker correlation with the input HDR picture. This leads to low predictive-coding performance of the picture or sequence of pictures.

According to a second approach, a backlight picture is determined from the luminance component of an input HDR picture. A residual picture is then obtained by dividing the input HDR picture by the backlight picture and both the backlight picture and the residual picture are directly encoded.

FIG. 1 shows an example of this second approach for encoding a HDR picture (more details for example in WO2013/102560).

In step 100, a module IC obtains the luminance component L and potentially at least one color component C(i) of a HDR picture I to be encoded. The HDR picture I may belong to a sequence of HDR pictures.

For example, when the HDR picture I belongs to the color space (X,Y,Z), the luminance component L is obtained by a transform f(.) of the component Y, e.g. L=f(Y).

When the HDR picture I belongs to the color space (R,G,B), the luminance component L is obtained, for instance in the 709 gamut, by a linear combination which is given by:

$$L = 0.2127.R + 0.7152.G + 0.0722.B$$

In step 101, a module BAM determines a backlight picture Bal from the luminance component L of the HDR picture I.

In step 102, the data needed to determine the backlight picture Bal, output from step 101, are encoded by means of an encoder ENC2 and added in a bitstream F2 which may be stored on a local or remote memory and/or transmitted through a communication interface (e.g. to a bus or over a communication network or a broadcast network).

In step 103, a LDR picture LDR2 is obtained from a ratio between the HDR picture and the backlight picture Bal.

More precisely, the luminance component L and potentially each colour component C(i) of the picture I, obtained from the module IC, is divided by the backlight picture Bal. This division is done pixel per pixel.

For example, when the components R, G or B of the HDR picture I are expressed in the color space (R,G,B), the components $R_{LDR2}$, $G_{LDR2}$ and $B_{LDR2}$ are obtained as follows:

$$R_{LDR2} = R/Bal,\ G_{LDR2} = G/Bal,\ B_{LDR2} = B/Bal.$$

For example, when the components X, Y or Z of the HDR picture I are expressed in the color space (Y,Y,Z), the components $R_{LDR2}$, $Y_{LDR2}$ and $Z_{LDR2}$ are obtained as follows:

$$X_{LDR2} = X/Bal\ Y_{LDR2} = Y/Bal\ Z_{LDR2} = Z/Bal$$

In step 104, an operator TMO tone-maps the HDR picture I in order to get a LDR picture LDR1 having a lower dynamic range than the dynamic range of the HDR picture I.

Any specific tone-mapping operator may be used such as, for example, the tone-mapping operator defined by Reinhard may be used (Reinhard, E., Stark, M., Shirley, P., and Ferwerda, J., \*Photographic tone reproduction for digital pictures,*" *ACM Transactions on Graphics* 21 (July 2002), or Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), *Proc. SPIE* 8499, *Applications of Digital Picture Processing* (p. 84990D-84990D-10)).

In step 105, the LDR pictures LDR1 and LDR2 are encoded by means of a predictive encoder ENC1 in at least one bitstream F1. More precisely, the LDR picture LDR1 (or LDR2) is used as a reference picture to predict the other LDR picture LDR2 (or LDR1). A residual picture is thus obtained by subtracting the prediction picture from the LDR picture and both the residual picture and the prediction picture are encoded.

The bitstream F1 may be stored on a local or remote memory and/or transmitted through a communication interface (e.g. on a bus or over a communication network or a broadcast network).

This second approach is backward compatible in the sense that a LDR picture LDR1 may be decoded and displayed by means of a traditional apparatus and the HDR picture I may also be decoded and displayed by decoding the LDR picture LDR2 and the data needed to determine a decoded version of the backlight picture Bal.

This second approach leads sometimes to a LDR picture LDR1 with a weaker correlation with the other LDR picture LDR2 because those two pictures are not obtained from the HDR picture I by using same means: one is obtained by dividing the HDR picture by the backlight picture Bal and the other one is obtained by applying a tone-mapping operator. This leads to a sparse residual content having sometimes locally important values (lighting artefacts), lowering thus the coding performance of the picture or sequence of pictures.

3. SUMMARY

In light of the foregoing, aspects of the present disclosure are directed to creating and maintaining relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy some of the drawbacks of the prior art with a method for encoding a HDR picture and a first LDR picture, the method comprising:
  obtaining a second LDR picture (LDR2) responsive to a ratio between the HDR picture and a backlight picture (Bal);
  encoding the first LDR picture and the second LDR picture (LDR2) by predicting one of the first and second LDR pictures by the other one of the first and second LDR pictures. The method further comprises, before encoding, adjusting the first LDR picture responsive to the backlight picture.

According to an embodiment, the first LDR picture is adjusted by multiplying the first LDR picture by a coefficient value (CV1) which depends on the backlight picture (Bal).

Adjusting the first LDR picture responsive to the backlight picture attenuate the lighting artefacts introduced, in the second LDR picture. Thus, introducing similar lighting artefacts in the first LDR picture increases the correlation between the two LDR pictures, decreases the dynamic of the residual and thus increases the predictive-coding performance.

According to one of its other aspects, the disclosure relates to a method for decoding a LDR picture providing a lower dynamic range depiction of the content of an HDR picture. The method obtaining the LDR picture by a at least partially decoding a bitstream, is characterized in that:
  the decoded LDR picture is obtained by adjusting the obtained LDR picture responsive to a backlight picture calculated from the HDR picture.

Advantageously, introducing similar lighting artefacts in the LDR picture is a process which is implemented, at the encoder side, by adjusting the obtained LDR picture responsive to a backlight picture calculated from the HDR picture. Thus, at the decoder side, a inverse process is used for removing such lighting artifacts.

Thus, one advantage of the method is to reduce the coding cost of the LDR picture while maintaining the backward compatibility of the encoding/decoding method in the sense that the encoded LDR picture may be decoded and displayed by means of a traditional apparatus.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated. It shows:

Similar or same elements are referenced with the same reference numbers.

5. DESCRIPTION OF EMBODIMENTS

Figure 1:
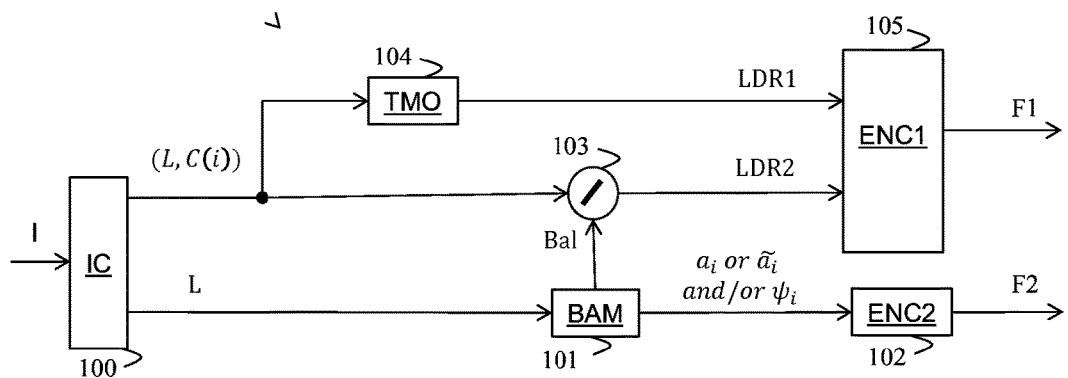
FIG. 1 shows a block diagram of the steps of a method for encoding an HDR picture in accordance with prior art.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding a picture but extends to the encoding/decoding of a sequence of pictures (video) because each picture of the sequence is sequentially encoded/decoded as described below.

Figure 2:
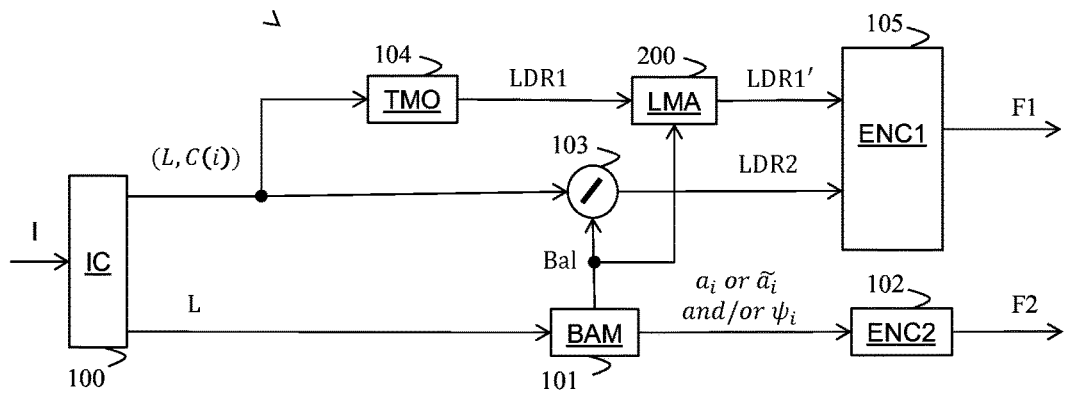
FIG. 2 shows a block diagram of the steps of a method for encoding an HDR picture in accordance with an embodiment of the disclosure.

FIG. 2 shows a block diagram of the steps of a method for encoding an HDR picture in accordance with an embodiment of the disclosure.

Figure 4:
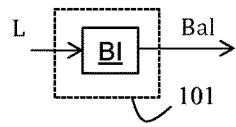
FIGS. 4-7 show block diagrams of a step of the method of FIG. 1 in accordance with embodiments of the disclosure.

According to an embodiment of the step 101, illustrated in FIG. 4, a module BI determines a backlight picture Ba as being a weighted linear combination of shape functions $\psi_i$ given by:

$$Ba = \Sigma_i a_i \psi_i \quad (1)$$

with $a_i$ being weighting coefficients.

Thus, determining a backlight picture Ba from a luminance component L consists in finding optimal weighting coefficients (and potentially also optimal shape functions if not known beforehand) in order that the backlight picture Ba fits the luminance component L.

There are many well-known methods to find the weighting coefficients $a_i$. For example, one may use a least mean square method to minimize the mean square error between the backlight picture Ba and the luminance component L.

The disclosure is not limited to any specific method to obtain the backlight picture Ba.

It may be noted that the shape functions may be the true physical response of a display backlight (made of LED's for instance, each shape function then corresponding to the response of one LED) or may be a pure mathematical construction that fits the luminance component best.

According to this embodiment, the backlight picture Bal, output from step 101, is the backlight picture Ba given by equation (1).

Figure 5:
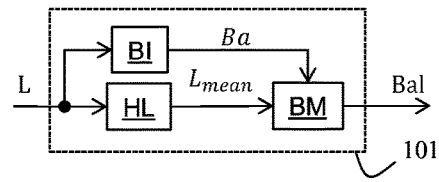

According to an embodiment of the step 101, illustrated in FIG. 5, a module BM modulates the backlight picture Ba (given by equation (1)) with a mean luminance value $L_{mean}$ of the HDR picture I obtained by the means of a module HL.

According to this embodiment, the backlight picture Bal, output from step 101, is the modulated backlight picture.

According to an embodiment, the module HL is configured to calculate the mean luminance value $L_{mean}$ over the whole luminance component L.

According to an embodiment, the module HL is configured to calculate the mean luminance value $L_{mean}$ by $$L_{mean} = E(L^\beta)^{\frac{1}{\beta}}$$

with $\beta$ being a coefficient less than 1 and E(X) the mathematical expectation value (mean) of the luminance component L.

This last embodiment is advantageous because it avoids that the mean luminance value $L_{mean}$ be influenced by a few pixels with extreme high values which usually leads to very annoying temporal mean brightness instability when the HDR picture I belongs to a sequence of HDR pictures.

The disclosure is not limited to a specific embodiment for calculating the mean luminance value $L_{mean}$.

Figure 6:
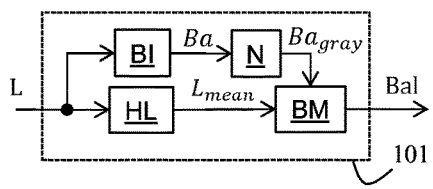

According to a variant of this embodiment, illustrated in FIG. 6, a module N normalizes the backlight picture Ba (given by equation (1)) by its mean value E(Ba) such that one gets a mid-gray-at-one backlight picture $Ba_{gray}$ for the picture (or for all pictures if the HDR picture I belongs to a sequence of HDR pictures):

$$Ba_{gray} = \frac{Ba}{E(Ba)}$$

Then, the module BM is configured to modulate the mid-gray-at-one backlight picture $Ba_{gray}$ with the luminance average value $L_{mean}$ of the luminance component L, by using the following relation $$Ba_{mod} = cst_{mod} \cdot L_{mean}{}^\alpha \cdot Ba_{gray} \quad (2)$$

with $cst_{mod}$ being a modulation coefficient and a being another modulation coefficient less than 1, typically ⅓.

A low-spatial-frequency version $L_{lf}$ of the luminance component L may be obtained, for example, by subsampling the luminance component L.

According to this variant, the backlight picture Bal, output from step 101, is the modulated backlight picture $Ba_{mod}$ given by equation (2).

It may be noted that the modulation coefficient $cst_{mod}$ is tuned to get a good looking brightness for the residual picture and highly depends on the process to obtain the backlight picture. For example, $cst_{mod} \approx 1.7$ for a backlight picture obtained by least means squares.

Practically, by linearity, all operations to modulate the backlight picture apply to the backlight coefficients $a_i$ as a correcting factor which transforms the coefficients $a_i$ into new coefficients $\tilde{a}_i$ such that one gets $$Ba_{mod} = \sum_i \tilde{a}_i \psi_i$$

Figure 7:
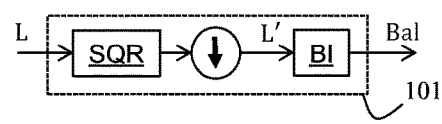

According to an embodiment of the step 101, illustrated in FIG. 7, the backlight picture Bal is determined from a processed version L' of the luminance component L. Such a processed version L' is, for example, determined by means of a module SQR which calculates the squared root of the luminance component L. The resulting version of the luminance component L is then sub-sampled in order that each value of the sub-sampled version of the luminance component L represents the luminance of a group of pixels of the HDR picture I.

Note that the processed version L' of the luminance component L may also be used rather than the luminance component L in the embodiments illustrated in FIGS. 4, 5 and 6.

As mentioned in the introductive part, the data needed to determine the backlight picture Bal, output from step 101, are encoded by means of an encoder ENC2 and added in a bitstream F2.

For example, the data to be encoded are limited to the weighting coefficients $a_i$ or $\tilde{a}_i$ when known non-adaptive shape functions are used, but the shape functions $\psi_i$ may also be a priori unknown and then encoded in the bitstream F2, for instance in a case of a somewhat optimal mathematical construction for better fitting. So, all the weighting coefficients $a_i$ or $\tilde{a}_i$ (and potentially shape functions $\psi_i$) are encoded in the bitstream F2.

Advantageously, the weighting coefficients $a_i$ or $\tilde{a}_i$ are quantized before being encoded in order to reduce the size of the bitstream F2.

The bitstreams F1 and F2 may be either separate bitstream or parts of a same bitstream.

In step 200 (FIG. 2), a module LMA adjusts the picture LDR1 responsive to the backlight picture Bal in order to attenuate the lighting artefacts.

According to an embodiment of the step 200, the LDR picture LDR1 is adjusted by dividing the LDR picture LDR1 by a coefficient value CV1 which depends on the backlight picture Bal.

Mathematically speaking, such adjusting can be given by:

LDR1'(x,y)=int(LDR1(x,y)/CV1)

where (x,y) is the spatial position of a pixel of the picture and int( ) is the integer value with the same bit-depth (e.g. 10 bits).

According to an embodiment of the step 200, the coefficient value CV1 is proportional to the pixel values of the backlight picture Bal:

CV1(x,y)=norm(Bal(x,y))*2 where norm means the normalization of the backlight picture Bal (between 0 and 1).

Figure 3:
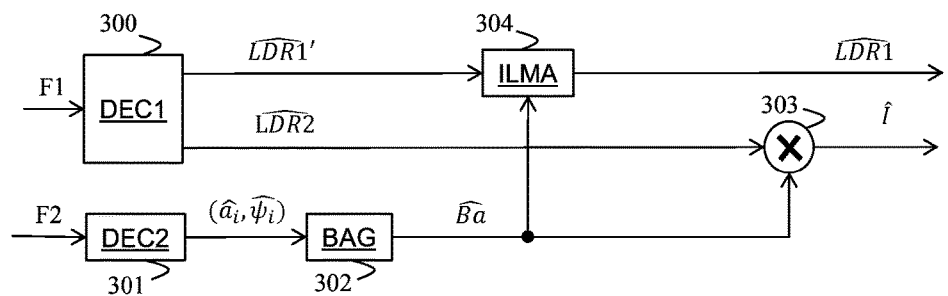
FIG. 3 shows a block diagram of the steps of a method for decoding an HDR picture in accordance with an embodiment of the disclosure.

FIG. 3 shows a block diagram of the steps of a method for decoding an HDR picture in accordance with an embodiment of the disclosure.

In step 301, a decoded version $\widehat{Ba}$ of the backlight picture is obtained by decoding at least partially the bitstream F2 by means of a decoder DEC2.

As explained before, some data needed to obtain the backlight picture, output of step 101, have been encoded (step 102) and then obtained by at least partially decoding the bitstream F2 which may have been stored locally or received from a communication network.

Following the example given above, weighting coefficients $\hat{a}_t$ (and potentially shape functions $\hat{\psi}_t$)) are then obtained as output of step 301.

Then, in step 302, a module BAG generates a decoded version $\widehat{Ba}$ of the backlight picture from the weighting coefficients $\hat{a}_t$ and either some known non-adaptive shape functions or the shape functions $\hat{\psi}_t$) by:

$\widehat{Ba} = \Sigma_i \hat{a}_t \hat{\psi}_t$)

In step 300, a first LDR picture $L\widehat{DR1}'$ and a second LDR picture $\widehat{LDR2}$ are obtained by at least a partial decoding of a bitstream F1 by means of a decoder DEC1. The bitstream F1 may have been stored locally or received from a communication network.

In step 303, obtaining a decoded HDR picture $\hat{I}$ responsive to a product of the second picture $\widehat{LDR2}$ by the backlight picture $\widehat{Ba}$.

In step 304, a module ILMA adjusts the first LDR picture $L\widehat{DR1}'$ responsive to the backlight picture $\widehat{Ba}$ in order to get a decoded version of the LDR picture LDR1.

According to an embodiment of the step 304, the first LDR picture $L\widehat{DR1}'$ is adjusted by multiplying the first LDR picture $L\widehat{DR1}'$ by a coefficient value (CV2) which depends on the backlight picture $\widehat{Ba}$.

Mathematically speaking, such adjusting is given by:

$L\widehat{DR1}_{(x,y)}=\text{int}(L\widehat{DR1}'_{(x,y)}*CV2)$ where (x,y) is the spatial position of a pixel of the picture and into is the integer value with the same bit-depth (e.g. 10 bits).

According to an embodiment of the step 303, the coefficient CV2 is proportional to the pixel values of the backlight picture $\widehat{Ba}$ given by:

$CV2(x,y)=\text{norm}(\widehat{(Ba}(x,y))*2$ where norm is the normalization of backlight picture $\widehat{Ba}$ signal (between 0 and 1).

The decoders DEC1 and DEC2 are configured to decode data which have been encoded by the encoder ENC1 and ENC2, respectively.

The encoders ENC1 and ENC2 (and decoders DEC1 and DEC2) are not limited to a specific encoder (decoder) but when an entropy encoder (decoder) is required, an entropy encoder such as a Huffmann coder, an arithmetic coder or a context adaptive coder like CABAC used in H.264/AVC ("*The H.264 Advanced Video Compression Standard*", second edition, Iain E. Richardson, Wiley) or HEVC (B. Bross, W. J. Han, G. J. Sullivan, J. R. Ohm, T. Wiegand JCTVC-K1003, "*High Efficiency Video Coding (HEVC)* text specification draft 9," October 2012) is advantageous.

The encoders ENC1 and ENC2 (and decoders DEC1 and DEC2) are not limited to a specific encoder which may be, for example, an picture/video coder like JPEG, JPEG2000, MPEG2, h264/AVC or HEVC.

Preferably, the ENC2 and DEC2 are lossless encoding/decoding scheme.

As described above, the LDR pictures LDR1' and LDR2 are encoded in a same bitstream F1. The encoder ENC1 may then conform to MVC (ISO/IEC 14996-10 annex H or ITU-T H.264 annex H).

But the LDR picture LDR1' and LDR2 may also be encoded in two separate bitstreams F1.

The present disclose relates also to a method for encoding a sequence of HDR pictures wherein each HDR picture of the sequence of HDR pictures is encoded according to a method described in relation with FIGS. 2, 4-7.

The present disclose relates also to a method for decoding a sequence of HDR pictures wherein each HDR picture of the sequence of HDR pictures is decoded according to a method described in relation with FIG. 3.

On FIGS. 2-7, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively "Application Specific Integrated Circuit", "Field-Programmable Gate Array", "Very Large Scale Integration", or from several integrated electronic components embedded in a device or from a combination of hardware and software components.

Figure 8:
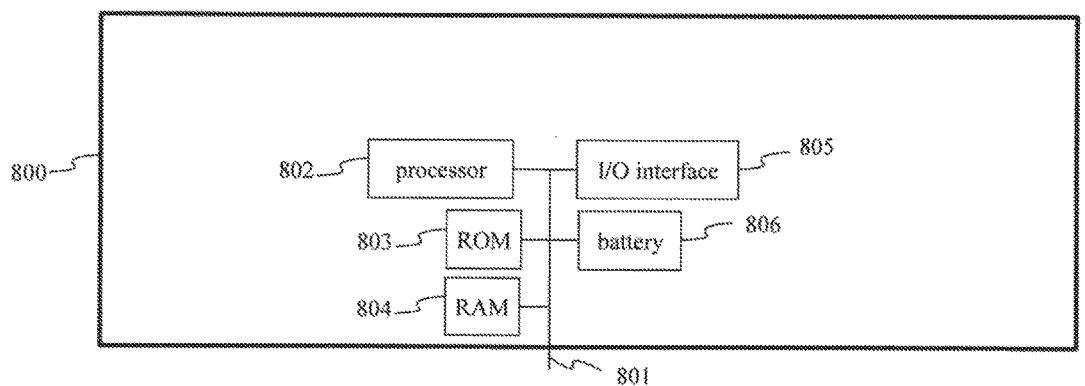
FIG. 8 shows an example of an architecture of a device in accordance with an embodiment of the disclosure.

FIG. 8 represents an exemplary architecture of a device 800 which may be configured to implement a method described in relation with FIGS. 2, 4-7.

Device 800 comprises following elements that are linked together by a data and address bus 801:
- a microprocessor 802 (or CPU), which is, for example, a DSP (or Digital Signal Processor);
- a ROM (or Read Only Memory) 803;
- a RAM (or Random Access Memory) 804;
- an I/O interface 805 for reception of data to transmit, from an application; and
- a battery 806

According to a variant, the battery 806 is external to the device. Each of these elements of FIG. 8 is well-known by those skilled in the art and won't be disclosed further. In each of mentioned memory, the word "register" used in the specification can correspond to area of small capacity (some bits) or to very large area (e.g. a whole program or large amount of received or decoded data). ROM 803 comprises at least a program and parameters. Algorithm of the methods according to the disclosure is stored in the ROM 803. When switched on, the CPU 802 uploads the program in the RAM and executes the corresponding instructions.

RAM 804 comprises, in a register, the program executed by the CPU 802 and uploaded after switch on of the device 800, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to an embodiment, the device 800 may be further configured to implement a method described in relation with FIG. 3. Thus, the device 800 may be either an encoder, a decoder or both.

According to a specific embodiment of encoding or encoder, the HDR picture I is obtained from a source. For example, the source belongs to a set comprising:
- a local memory (803 or 804), e.g. a video memory or a RAM (or Random Access Memory), a flash memory, a ROM (or Read Only Memory), a hard disk;
- a storage interface (805), e.g. an interface with a mass storage, a RAM, a flash memory, a ROM, an optical disc or a magnetic support;
- a communication interface (805), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded HDR picture $\hat{I}$ or the decoded picture $L\widehat{DR1}$ is sent to a destination; specifically, the destination belongs to a set comprising:
- a local memory (803 or 804), e.g. a video memory or a RAM, a flash memory, a hard disk;
- a storage interface (805), e.g. an interface with a mass storage, a RAM, a flash memory, a ROM, an optical disc or a magnetic support;
- a communication interface (805), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

According to different embodiments of encoding or encoder, the bitstream F1 and/or F2 are sent to a destination. As an example, one of bitstream F1 and F2 or both bitstreams F1 and F2 are stored in a local or remote memory, e.g. a video memory (804) or a RAM (804), a hard disk (803). In a variant, one or both bitstreams are sent to a storage interface (805), e.g. an interface with a mass storage, a flash memory, ROM, an optical disc or a magnetic support and/or transmitted over a communication interface (805), e.g. an interface to a point to point link, a communication bus, a point to multipoint link or a broadcast network.

According to different embodiments of decoding or decoder, the bitstream F1 and/or F2 is obtained from a source. Exemplarily, the bitstream is read from a local memory, e.g. a video memory (804), a RAM (804), a ROM (803), a flash memory (803) or a hard disk (803). In a variant, the bitstream is received from a storage interface (805), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

According to different embodiments, device 800 being configured to implement an encoding method described in relation with FIGS. 2, 4-7, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

According to different embodiments, device 800 being configured to implement a decoding method described in relation with FIG. 3, belongs to a set comprising:
- a mobile device;
- a communication device;
- a game device;
- a set top box;
- a TV set;
- a tablet (or tablet computer);
- a laptop;
- a display and
- a decoding chip.

Figure 9:
FIG. 9 shows two remote devices communicating over a communication network in accordance with an embodiment of the disclosure.

According to an embodiment illustrated in FIG. 9, in a transmission context between two remote devices A and B over a communication network NET, the device A comprises means which are configured to implement a method for encoding an picture as described in relation with the FIGS. 2, 4-7 and the device B comprises means which are configured to implement a method for decoding as described in relation with FIG. 3.

According to a variant of the disclosure, the network is a broadcast network, adapted to broadcast still pictures or video pictures from device A to decoding devices including the device B.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a HDR picture whose pixels values belong to a high-dynamic range, and a first LDR picture whose pixels values belong to a lower-dynamic range, the method comprising:
   obtaining a second LDR picture from a ratio between the HDR picture and a backlight picture determined as a representation of luminance of the HDR picture;
   obtaining a third LDR picture by dividing the pixel values of the first LDR picture by a coefficient value which is proportional to the pixel values of the backlight picture; and
   encoding the third LDR picture and the second LDR picture by predicting one of the third and second LDR pictures by the other one of the third and second LDR pictures.

2. The method of claim 1, wherein data needed to determine the backlight picture are lossless encoded.

3. A method for decoding a LDR picture providing a lower dynamic range depiction of the content of an HDR picture, the method comprising:
   obtaining a first LDR picture by at least partially decoding a bitstream;
   the decoded LDR picture is obtained by dividing the pixel values of said first LDR picture by a coefficient value which is proportional to pixel values of a backlight picture calculated from said HDR picture, said backlight picture being a representation of luminance of said HDR picture.

4. The method of claim 1 or 2, wherein the HDR picture belongs to a sequence of HDR pictures and the first LDR picture belongs to a sequence of LDR pictures.

5. The method of claim 3, wherein the LDR picture to-be-decoded belongs to a sequence of decoded LDR pictures and the HDR picture belongs to a sequence of HDR pictures.

6. A device for encoding a HDR picture, whose pixels values belong to a high-dynamic range, together with a first LDR picture whose pixels values belong to a lower-dynamic range, the device comprises a processor configured to:
   obtain a second LDR picture from a ratio between the HDR picture and a backlight picture determined as a representation of luminance of the HDR picture;
   obtain a third LDR picture by dividing pixel values of the first LDR picture by a coefficient value which is proportional to the pixel values of the backlight picture; and
   encode the third LDR picture and the second LDR picture by predicting one of the third and second LDR pictures by the other one of the third and second LDR pictures.

7. A device for decoding a LDR picture providing a lower dynamic range depiction of the content of a HDR picture, the device comprising a processor configured to:
   obtain a first LDR picture by at least partially decoding a bitstream,
   obtain the decoded LDR picture by dividing pixel values of said first LDR picture by a coefficient value which is proportional to pixel values of a backlight picture determined as representation of luminance of the HDR picture.

8. A non-transitory processor readable medium having stored therein instructions for causing a processor to perform at least the steps of the encoding method according to claim 1.

9. A non-transitory processor readable medium having stored therein instructions for causing a processor to perform at least the steps of the decoding method according to claim 3.

10. A non-transitory storage medium carrying instructions of program code for executing steps of a method according to claim 1, when said program is executed on a computing device.

* * * * *